United States Patent Office 3,296,233
Patented Jan. 3, 1967

3,296,233
PROCESS FOR INTRODUCING SECONDARY AMINO-ALKYL GROUPS INTO CROSS-LINKED AROMATIC VINYL POLYMERS
Herbert Corte, Opladen, and Otto Netz, Cologne-Ehrenfeld, Germany, assignors to Farbenfabriken Bayer Aktiengesellschaft, Leverkusen, Germany, a German corporation
No Drawing. Filed Nov. 12, 1964, Ser. No. 410,791
Claims priority, application Germany, Dec. 5, 1963, F 41,481
8 Claims. (Cl. 260—88.2)

It is already known that synethetic resins with anion-exchanging properties can be produced by introducing aminoalkyl groups into cross-linked aromatic vinyl polymers by haloalkylation and amination and, if desired, subsequent alkylation. It is also known that the polymers can be reacted with haloalkylimides of dibasic carboxylic acids and the products can be hydrolysed to form aminoalkyl derivatives. It is now, however, possible to obtain by the processes, synthetic resins containing exclusively secondary amino groups as anion-exchanging groups.

The production of such anion exchangers containing exclusively secondary amino groups could only be visualised by following complicated reaction sequences on anion exchangers containing exclusively primary amino groups, e.g. by monoacylation and subsequent alkylation of the primary amino groups and splitting of the acyl radical. Since, however, the alkylation of acyl derivatives of anion exchangers with primary amino groups would be likely to present difficulties (this alkylation reaction is difficult, even with compounds of low molecular weight), this procedure has not so far been adopted.

It has now been found that secondary amino alkyl groups can be introduced in a surprisingly simple manner into cross-linked aromatic polymers by reacting the polymers, in the presence of swelling agents and Friedel-Crafts catalysts, with N-haloalkyl-N-alkyl acyl amides to form the corresponding acylamidoalkyl derivatives and removing the acyl groups from the latter by hydrolysis.

When carrying out this process, it is possible to use N-haloalkyl-N-alkylacylamides of the following general formula:

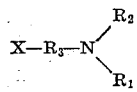

wherein:
$R_1$ represents an acyl radical, more specially the acyl radical of a monobasic carboxylic acid, such as an aliphatic, cycloaliphatic, aromatic or araliphatic carboxylic acid, which can be substituted, for example by halogen atoms, such as acetyl, trichloroacetyl or benzoyl;
$R_2$ represents an optionally substituted hydrocarbon radical, more especially an aliphatic preferably a $C_1$ to $C_6$ alkyl or araliphatic radical, such as methyl, ethyl, propyl, hexyl or benzyl;
$R_3$ represents a divalent hydrocarbon radical, such as an aralkylene radical e.g. or an alkylene radical with 1 to 6 carbon atoms, advantageously a methylene radical, and
X represents a halogen atom, advantageously chlorine or bromine.

The most preferred N-haloalkyl-N-alkylacyl amides useful in the process of this invention have the general formula

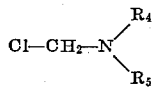

wherein $R_4$ represents the radical of a monobasic lower alkyl carboxylic acid, e.g. the acetyl, propionyl, butyryl and trichloroacetyl radical and the radical of an aromatic carboxylic acid, e.g. benzoyl, and $R_5$ represents a $C_1$ to $C_6$ alkyl radical, e.g. methyl, propyl, hexyl, a $C_5$ to $C_7$ cycloalkyl radical, e.g., cyclohexyl, the benzyl radical and a halogenated benzyl radical, e.g. p-chlorobenzyl.

Suitable N-haloalkyl-N-acyl amides are for instance N-chloromethyl - N-methylacet-amide, N-chloromethyl-N-ethyl acetamide, N-chloromethyl-N-methyl propionamide, N-p-chlorobenzyl-N-chloromethyl acetamide, N-cyclohexyl-N-chloromethyl acetamide and N-benzyl-N-chloromethyl acetamide.

The cross-linked polymers based on aromatic vinyl compounds that are used in the present process are known per se. Particularly useful are copolymers of a predominant proportion of aromatic monovinyl compounds, for example styrene, substituted styrenes or vinyl naphthalene, and a subordinate proportion of aromatic or aliphatic compounds with several, preferably 2 to 4 vinyl groups, for example divinyl benzene, substituted divinyl benzenes, divinyl ketone or polyesters of polyhydric alcohols and olefinically unsaturated carboxylic acids, such as ethylene glycol dimethacrylate. These copolymers can have either a gel structure or a sponge structure. Such copolymers are, for example, described in German Patents 829,223, 841,796 and 848,257, in U.S. Patents 2,597,439 and 2,597,440 and in German Auslegeschrift 1,045,102.

$AlCl_3$, $SnCl_4$ and/or $ZnCl_2$ can, for example, be used as Friedel-Crafts catalysts.

Suitable swelling agents include, for example, halogenated hydrocarbons, such as ethylene chloride and perchloroethylene.

The reaction of the copolymers with the N-haloalkyl-N-alkylacyl amides may be carried out in the presence of a swelling agent and a Friedal-Crafts catalysts at temperatures of about 40 to 150° C., preferably at about 60 to 100° C., sometimes at the boiling point of the swelling agent, until the evolution of hdyrogen halide has stopped. The alkylacylamides are advantageously used in at least molar quantities, calculated on the aromatic nuclei present in the copolymer. The upper limit of the amount of the alkylacylamides is not critical, but it is preferred to use not more than 5 times the molar amount calculated on the aromatic nuclei present in the copolymer.

The copolymers obtained in this way comprise aromatic nuclei which are substituted by radicals of the general formula

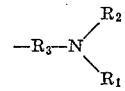

or

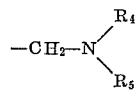

wherein the substituents $R_1$, $R_2$, $R_3$, $R_4$ and $R_5$ have the meanings given above. The source of the reaction is surprising, since it could not be anticipated that the N-halo-N-alkylacylamides used according to the invention are suitable for introducing the particular radicals into cross-linked aromatic vinyl polymers.

For hydrolysing the acylamido alkyl derivatives, it is possible to use processes which are known per se, such as alkaline or acid hydrolysis, in the presence or absence of solvents or swelling agents; it is advantageous to work at high temperatures.

The anion exchangers obtained according to the invention and having exclusively secondary amino groups are of particular interest, since their basicity lies between that of polymers with primary amino groups and polymers with quaternary ammonium groups; whilst they show less tendency to carbamic acid formation than the former and substantially higher thermal and chemical stability than the latter.

In addition, the anion exchangers obtained according to the invention are suitable for the production of valuable secondary products. For example, the secondary amino groups can be converted, in a manner known per se, into tertiary amino groups, giving ion exchangers which swell in hydrocarbons. Acidic groups can also be introduced into the anion exchangers by reacting the secondary amino groups with, for example, sodium chloroacetate or sodium chloroethyl sulphonate. Furthermore, the secondary amino groups can be reacted with chloroalkylphosphonic acid esters and the reaction products can be hydrolysed and, optionally, oxidised.

Example 1

121.5 g. of N-methyl-N-chloromethylacetamide at a temperature below 25 to 30° C., are introduced dropwise, while stirring and cooling externally into a suspension of 133 g. of aluminum chloride in 100 ml. of ethylene chloride, a clear, dark solution being formed. 100 g. of a bead polymer, which has been produced from a mixture of 96% of styrene, 2% of ethyl styrene and 2% of divinyl benzene by suspension polymerisation, using 1% of benzoyl peroxide as catalyst, are steeped in this reaction mixture. The reaction mixture is then heated, lastly under reflux, until the evolution of hydrochloric acid ceases (about 12 hours). After filtering off the reaction solution with suction, the remaining beads are washed with methanol and with water. The beads are dried with suction and heated for 12 hours at 95 to 100° C. with 500 ml. of 10% hydrochloric acid. After cooling, the reaction liquid is filtered off with suction. The beads are washed until free from chloride, first of all with water and then with 5% aqueous sodium hydroxide solution, and finally again with water until they are neutral. There are obtained 300 ml. of an anion exchanger in the OH form with an HCl-combining power of 1.87 g. equivalents per litre.

Example 2

100 g. of a cross-linked bead polymer of 96% of vinyl toluene, 2% of ethylstyrene and 2% of divinyl benzene are steeped in a reaction mixture prepared according to Example 1 from 1000 ml. of ethylene chloride, 133 g. of aluminum chloride and 121.5 g. of N-methyl-N-chloromethylacetamide and condensed by heating, finally under reflux, until the evolution of hydrochloric acid ceases. After filtering off the reaction liquid with suction, the beads are washed in a manner similar to Example 1, hydrolysed with 10% hydrochloric acid and washed once more. 350 ml. of an anion exchanger in the OH form, with an HCl-combining power of 1.7 g. equivalents per litre, are obtained.

Example 3

100 g. of a bead polymer which has been prepared by suspension polymerisation of 92% of styrene, 4% of ethyl styrene and 4% of divinyl benzene with addition of 60% (based on polymerisable substances) of an aliphatic $C_{12}$ hydrocarbon with benzoyl peroxide as catalyst are steeped in a reaction mixture of 1000 ml. of ethylene chloride, 133 g. of aluminum chloride and 121.5 g. of N-methyl-N-chloromethylacetamide, which has been prepared with external cooling. The reaction mixture is boiled under reflux until the evolution of hydrochloric acid has ceased. The reaction product is isolated in accordance with Example 1, washed and hydrolysed with 10% hydrochloric acid. 320 ml. of a spongy anion exchanger in the OH form with an HCl-combining power of 1.95 g. equivalents per litre are obtained.

Example 4

62 g. of N-chloromethyl-N-methylacetamide at a temperature below 30° C. are added dropwise to a suspension of 50 g. of anhydrous zinc chloride in 500 ml. of ethylene chloride. 50 g. of a bead polymer of 96 parts by weight of styrene, 2 parts by weight of ethyl styrene and 2 parts by weight of divinyl benzene are steeped in this reaction mixture and boiled for twelve hours under reflux. The reaction product is suction-filtered, washed with methanol and water and heated for 10 hours at 100° C. with 250 parts by weight of 10% aqueous hydrochloric acid. After again suction-filtering and washing with 5% aqueous sodium hydroxide solution and water, 150 ml. of an anion exchanger in the OH form with an HCl-combining power of 2.17 g. equivalents per litre are obtained.

Example 5

100 g. of bead polymer of 92 parts by weight of styrene, 4 parts by weight of ethyl styrene and 4 parts of divinyl benzene are steeped in a reaction mixture prepared according to Example 1 from 500 ml. of ethylene chloride, 133 g. of aluminum chloride and 121.5 g. of N-methyl-N-chloromethylacetamide. The mixture is then boiled under reflux for 12 hours whilst hydrochloric acid gas escapes. After the reaction liquid has been suction-filtered, the beads are washed with methanol and water and heated for ten hours at 95 to 100° C. with 10% hydrochloric acid. The reaction product isolated by suction-filtering is washed free from chloride with 5% sodium hydroxide solution and washed neutral with water. 260 ml. of an anion exchanger in the OH form with an HCl-combining power of 1.87 g. equivalents per litre are obtained.

We claim:

1. A process for introducing secondary aminoalkyl groups into cross-linked aromatic vinyl polymers, which comprises reacting the polymers at a temperature of about 40°–150° C. with at least about molar quantities of an N-haloalkyl-N-alkylacylamide derived from a monobasic carboxylic acid in the presence of a swelling agent and a Friedel-Crafts catalyst to form the corresponding acylamidoalkyl derivatives, and thereafter splitting off acyl groups from the latter by hydrolysis.

2. Process according to claim 1 wherein said vinyl polymer is a copolymer of styrene and divinyl benzene.

3. Process according to claim 1 wherein the swelling agent is ethylene chloride.

4. Process according to claim 1 wherein the N-haloalkyl-N-alkylacylamide is N-methyl-N-chloromethylacetamide.

5. A process of claim 1 wherein the N-haloalkyl-N-alkylacylamide has the formula

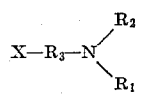

in which $R_1$ is an acyl radical of a monobasic carboxylic acid, $R_2$ is a member selected from the group consisting of aliphatic and araliphatic radicals, $R_3$ is a divalent alkylene radical and X defined as halo.

6. A process of claim 1 wherein the N-haloalkyl-N-alkylacylamide has the formula

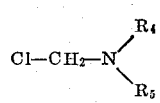

in which $R_4$ is a member selected from the group consisting of a radical of a monobasic lower alkyl carboxylic acid and the radical of an aromatic carboxylic acid, $R_5$ is a member selected from the group consisting of alkyl having 1–6 carbon atoms, a cycloalkyl having 5–7 carbon atoms, benzyl and halogenated benzyl.

7. A process of claim 1 wherein the cross-linked aromatic vinyl polymers consist of a predominant proportion of aromatic monovinyl compounds and a subordinate proportion of compounds with several vinyl groups; the swelling agent is a halogenated hydrocarbon; the Friedel- Crafts catalyst is a member selected from the group consisting of aluminum chloride, tin tetrachloride and zinc chloride; and the N-haloalkyl-N-alkylacylamide is a compound of the formula

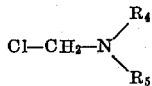

wherein $R_4$ is a member selected from the group consisting of a radical of a monobasic lower alkyl carboxylic acid and radical of an aromatic carboxylic acid; $R_5$ is a member selected from the group consisting of an alkyl radical having 1–6 carbon atoms, a cycloalkyl radical having 5–7 carbon atoms, the benzyl radical and a halogenated benzyl radical.

8. A process of claim 7 wherein the vinyl polymer is a copolymer of styrene and divinyl benzene, and utilizing about 1–5 mols, based on the aromatic nuclei of the polymer, of

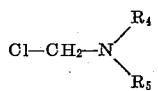

effecting the reaction at a temperature of about 60°–100°.

References Cited by the Examiner

UNITED STATES PATENTS 3,006,866  10/1961  Corte et al. _____ 260—2.1

WILLIAM H. SHORT, *Primary Examiner.*

C. A. WENDEL, *Assistant Examiner.*